Patented Aug. 29, 1939

UNITED STATES PATENT OFFICE 2,171,498

SULPHONATES OF POLYARYL POLYETHERS

Herman A. Bruson, Philadelphia, Pa., assignor to Röhm & Haas Company, Philadelphia, Pa.

No Drawing. Application April 8, 1937, Serial No. 135,671

14 Claims. (Cl. 260—511)

This invention relates to new capillary active compounds; namely, sulphonates and polysulphonates of aromatic polyethers having the general formula R—O—A—O—R' wherein R and R' are each aromatic nuclei, at least one of which contains a nuclear hydrocarbon or acyl substituent having more than three carbon atoms, and A is an aliphatic group, preferably an alkylene group or a polyalkylene ether group in which at least two carbon atoms separate successive ether atoms.

These products are useful as wetting, emulsifying, cleansing and spreading agents, and as introfying agents in the textile industry.

In general, they are prepared in two or more stages, from a phenol having a nuclear hydrocarbon or acyl substituent of more than three carbon atoms, an aliphatic compound containing a halogen atom on two of its terminal carbon atoms, and a sulphonating agent. Among the various alternative specific procedures that can be used may be mentioned the following—

1. Two mols of the phenol can be condensed with one mol of the aliphatic dihalide in the presence of caustic alkali to form the diaryl diether which can then be sulphonated.

2. Two mols of a sulphonated phenol of the class described can be condensed with one mol of the aliphatic dihalide in the presence of caustic alkali.

3. One mol of the phenol can be condensed with one mol of the aliphatic dihalide in the presence of caustic alkali so as to etherify only one end of the dihalide and the resulting product condensed with the same or a different phenol in the presence of caustic alkali to etherify the other end. The product may then be sulphonated or one of the starting phenols, or both, may be sulphonated prior to condensation.

4. Two mols of aryloxy aliphatic halide obtained by the reaction of one mol of a phenol and one of aliphatic dihalide, as above, can be reacted with sodium sulphide as described in detail in my copending patent application Serial No. 117,516 filed December 24, 1936, and the product sulphonated. Other compounds capable of splitting out two halide atoms in a similar way can be used in place of the sodium sulphide.

These reactions are applicable to such phenols as butyl, amyl, hexyl, cyclohexyl, benzyl, phenyl, octyl, decyl, undecyl, lauryl, oleyl, cetyl, or octadecylphenols or the corresponding cresols, xylenols or naphthols; the butyryl, valeryl, octoyl, dodecoyl, stearoylphenols, the corresponding cresols, xylenols, or naphthols, as well as the nuclear chloro, alkoxy, or sulphonic and derivatives of the above phenolic compounds. The alkyl or acyl groups can be branched-chain or straight-chain in character. For practical reasons the alkyl phenols having from four to eighteen carbon atoms in the alkyl group are preferred.

It is not necessary that both the aromatic groups be derived from substituted phenols. If one contains a four or more carbon atom hydrocarbon or acyl group, the other may be unsubstituted or contain a substituent of less than four carbon atoms.

As examples of the aliphatic dihalides, one can use ethylene dichloride, propylene dichloride, butylene dichloride, 1,5-dichlor-pentane, 1,10-dichlordecane, and higher homologues thereof; or the corresponding bromides or iodides. Or one may use $\beta,\beta'$-dichlor-diethyl ether, $\beta,\beta'$-dichlordiisopropyl ether, $\beta$-chloroethoxy-$\beta'$-chlorodiethyl ether, or the corresponding thioethers.

In order to illustrate the invention the following examples are given with the understanding that the invention is not restricted to them.

*Example 1.*—Bis-($\beta$-ter-octylphenoxy)-ethanedisulphonate. A mixture consisting of 412 g. p-$\alpha$,-$\alpha,\gamma,\gamma$-tetramethylbutylphenol (U. S. Patent 2,008,017), 99 g. ethylene dichloride, 400 cc. water, and 93.6 g. sodium hydroxide was heated in an iron autoclave with constant agitation for 6 hours at 150–160° C. The product obtained was boiled with water. The oil layer, after cooling, solidified to a crystalline mass of bis-$\beta$-(p-$\alpha,\alpha,\gamma,\gamma$-tetramethylbutylphenoxy)-ethane

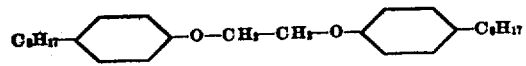

which crystallizes from alcohol in colorless crystals melting at 81–83° C. Yield 405 g.

This product was disulphonated by dissolving 87.6 g. in 250 g. of ethylene dichloride and cooling the solution to 0° C., then adding dropwise 49 g. of chlorsulphonic acid with constant stirring, during which time the temperature rose to 15° C. After all had been added, the temperature was allowed to rise to 25–30° C. and held thereat for 3 hours. The reaction was completed by heating at 50° C. for 4 hours. 350 cc. of water was then added and the mixture neutralized with sodium hydroxide solution. Upon evaporating to dryness, a white powder was obtained which is soluble in hot water to give a solution having a very low interfacial tension when measured against oil, and is useful as an emulsifying agent.

*Example 2.*—A mixture consisting of 206 g. p-α,α,γ,γ-tetramethylbutylphenol, 71.5 g. β,β'-dichlordiethyl ether, 46.8 g. sodium hydroxide, and 200 cc. water was heated in an iron autoclave, with constant agitation, for 6 hours at 140–150° C. The oil was washed with water and distilled in high vacuum. It formed a pale yellow oil boiling at 245–290° C./4 mm., which, upon standing with alcohol for several days, crystallized. M. P. 46–48° C. The product is

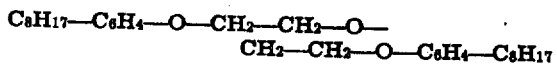

96 g. of the above compound was dissolved in 300 g. ethylene dichloride. To this solution, with stirring and cooling to 10° C., 49 g. chlorsulphonic acid was added dropwise during 45 minutes. After stirring for an additional 3 hours at room temperature, the solvent was evaporated off under reduced pressure on a water bath. The crude product obtained was recrystallized from hot water. It is the free disulphonic acid and forms fine, colorless needles. The sodium and potassium salts are soluble in hot water to give a very foamy solution. The triethanolamine salt is soluble in cold water and is useful as a wetting agent.

*Example 3.*—A mixture consisting of 206 g. p-α,α,γ,γ-tetramethylbutylphenol, 94 g. β-chlorethoxy-β'-chlorodiethyl ether, 46.8 g. sodium hydroxide, and 200 cc. water was heated in an iron autoclave for 6 hours with good agitation at 170–180° C. The product was washed with hot water, leaving an oil which rapidly crystallized. It forms colorless crystals, M. P. 72–73° C. (from alcohol). Yield 256 g. The product has the formula—

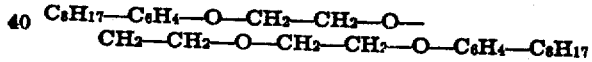

A solution of 105 g. of the above product in 300 g. ethylene dichloride was reacted at room temperature with 49 g. chlorsulphonic acid added dropwise with constant stirring. The temperature rose to 40° C. The mixture was stirred for 2 hours and allowed to stand 8 hours. 200 cc. of water was then added and the free disulphonic acid was neutralized with sodium hydroxide solution. The solvent and water were removed by evaporation under reduced pressure, leaving a white powder which was readily soluble in cold water to give a solution having powerful capillary activity.

*Example 4.*—A mixture consisting of 300 g. p-ter-butyl-phenol, 99 g. ethylene dichloride, 400 cc. water, and 93.6 g. sodium hydroxide was heated in an iron autoclave with stirring for 6 hours at 180–190° C. The crystalline product obtained was purified by crystallization from alcohol. It has the formula—

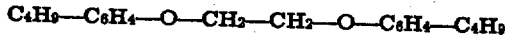

and melted at 91° C.

A solution of 65.2 g. of the above ether in 200 g. ethylene dichloride was cooled to 10° C. and with agitation and cooling, 49 g. chlorsulphonic acid was added dropwise during one hour. The mixture was stirred for 3 hours thereafter at 25–30° C. and allowed to stand 18 hours. It was then diluted with 200 cc. of water and neutralized with aqueous caustic soda solution. The solvent and water were then removed by evaporation under reduced pressure. The disulphonate obtained was a white powder, which dissolved in water to a foamy solution having good wetting properties.

*Example 5.*—A mixture consisting of 103 g. p-α,α,γ,γ-tetramethylbutyl phenol, 100 g. β-phenoxy-β'-chlorodiethyl ether, 23 g. sodium hydroxide, and 200 cc. water was heated with stirring in an iron autoclave for 6 hours at 180–190° C. The oil obtained was washed thoroughly with water. It crystallized in the cold to a waxy mass. After recrystallization from alcohol, a product melting at 53–54° C. and having the formula

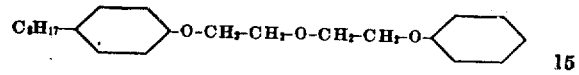

was obtained.

To a solution of 74 g. of the above ether in 200 g. ethylene dichloride, there was added, between 20° and 30° C., with agitation, 49 g. of chlorsulphonic acid. The mixture was stirred for 18 hours at room temperature, and then neutralized with 10% sodium hydroxide solution. The water and solvent were then evaporated off under reduced pressure, leaving the white powdery disulphonate, useful as a wetting agent.

*Example 6.*—A mixture consisting of 31.3 g. β-p-α,α,γ,γ-tetramethylbutylphenoxy-β'-chlorodiethyl ether, 20 g. p-phenol-sodium sulphonate, 4.3 g. sodium hydroxide, and 150 cc. of water was heated at 180–190° C. with stirring in an autoclave for 8 hours. The soap-like product obtained consists of the p-ter-octylphenoxyethoxyethyl ether of phenol-sodium sulphonate, having the formula

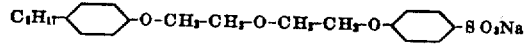

*Example 7.*—A mixture of 300 g. p-ter-butylphenol, 92.6 g. sodium hydroxide, 400 g. water, and 143 g. β,β'-dichlorodiethyl ether was heated, with stirring, in an autoclave for 6 hours at 180–190° C. The oil was washed with water and crystallized from alcohol. The product is

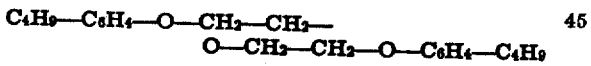

It forms colorless crystals, M. P. 34–35° C.

76 g. of the above crystals dissolved in 200 g. ethylene dichloride was sulphonated as in Example 4 with 49 g. chlorsulfonic acid. The disulfonic acid formed was neutralized with potassium hydroxide solution and the solution evaporated to dryness. The disulphonate is a water-soluble white powder which gives a foamy solution. It is useful as an introfying agent.

*Example 8.*—A mixture consisting of 72 g. β-naphthol, 23.4 g. sodium hydroxide, 600 cc. water and 156 g. of β-(p-α,α,γ,γ-tetramethylbutylphenoxy)-β'-chlorodiethyl ether was heated at 180–190° C. for 6 hours, with stirring, in a steel autoclave. The product obtained was a low melting waxy mass, having the formula

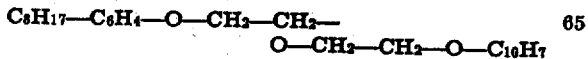

To a solution of 84 g. of the above β-ter-octylphenoxy-β'-naphthoxy-diethyl ether in 200 g. ethylene dichloride, there was added, while stirring and cooling, 73.4 g. of chlorsulphonic acid. After stirring for 6 hours at room temperature, the disulphonic acid formed was neutralized with aqueous sodium hydroxide solution and evaporated to dryness. The product was a creamcolored water-soluble powder, capable of lowering the surface tension of water to a marked degree.

*Example 9.*—A mixture consisting of 300 g. p-ter-butylphenol, 187 g. β-chloro-ethoxy-β'-chlorodiethyl ether, 94 g. sodium hydroxide, and 400 cc. of water was heated at 180–190° C. for 6 hours, with stirring, in a steel autoclave. The oil formed consisted essentially of the compound

C₄H₉—C₆H₄—O—CH₂CH₂—O—
        CH₂CH₂—O—CH₂CH₂—O—C₆H₄—C₄H₉

It formed colorless crystals, M. P. 32° C. (from alcohol).

To a solution of 82 g. of the above β-ter-butyl phenoxy-ethoxy -β'- p-ter-butylphenoxy - diethyl ether in 200 g. ethylene dichloride, there was added 45 g. of fuming sulphuric acid (20% SO₃) at 0–5° C. and the mixture stirred for 8 hours thereafter at 20–25° C. The product obtained

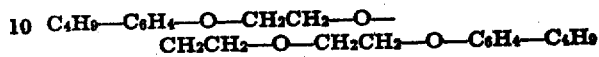

after neutralization with soda and drying was a white powder which dissolved in water to a foamy solution.

*Example 10.*—A mixture consisting of 164 g. p-ter-amylphenol, 50 g. ethylene dichloride, 47 g. sodium hydroxide, and 400 cc. of water was heated for 6 hours at 180–190° C. in a steel autoclave, while stirring continuously. The oily material was washed and crystallized from alcohol. The bis - β - β'- (p-ter-amyl-phenoxy) -ethane formed colorless needles, M. P. 64° C.

A solution of 27.3 g. of the above product in 100 g. ethylene dichloride was sulphonated at 15–20° C. with 18.7 g. chlorsulphonic acid for five hours. The solution was neutralized with a 10% sodium hydroxide solution and evaporated to dryness in vacuo. The product was a white powder useful as an emulsifying agent.

*Example 11.*—The condensation product of laurylphenol and β-chloroethoxy-β'-chlorodiethyl ether having the probable formula C₁₂H₂₅—C₆H₄—O—CH₂—CH₂—
        O—CH₂—CH₂—O—CH₂CH₂Cl was heated with a molecular equivalent quantity of phenol and sodium hydroxide, together with an equal volume of water at 190° C. for 14 hours in an autoclave, with stirring. The product was an oil which, upon sulphonation with 2 mol equivalents of chlorsulphonic acid, gave a very foamy, soapy disulphonic acid. The ammonium or sodium salt thereof can be used as a detergent.

*Example 12.*—Disulphonate of

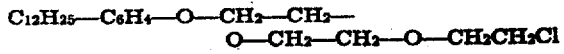

A mixture consisting of 156 g. β-p-α,α,γ,γ-tetramethylbutylphenoxy-β'-chlorodiethyl ether, 75 g. p-ter-butyl-phenol, 24 g. sodium hydroxide, and 600 g. water, was heated in an autoclave for 16 hours at 180–190° C. with constant stirring. The product was washed with hot water and dried.

42.6 g. of the above β-p-ter-butylphenoxy-β'-p-ter-octylphenoxy-diethyl ether was dissolved in 100 g. of ethylene dichloride and sulphonated at 5–10° C. with 24.3 g. chlorsulphonic acid. The product was neutralized with sodium hydroxide solution and evaporated to dryness in vacua, leaving a white water-soluble powder, useful as a wetting agent.

*Example 13.*—A mixture consisting of 62 g. guaiacol, 23.4 g. sodium hydroxide, 400 cc. of water, and 156 g. β(p-α,α,γ,γ-tetramethylbutylphenoxy)-β'-chlorodiethyl ether, was heated for 9 hours at 180–190° C. with agitation, in a steel autoclave. The oil obtained was washed and distilled in vacuo. The product,

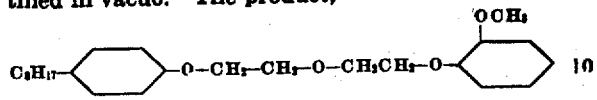

came over at 238–250° C./4 mm. as a pale yellow oil.

37 g. of the above oil in 100 g. ethyl acetate was sulphonated at 10–20° C. with 24 g. chlorsulphonic acid and neutralized with 10% caustic soda solution. The foamy solution obtained, upon evaporation, gave a white powder useful as a wetting agent.

*Example 14.*—Trisulphonate of

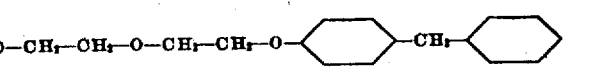

A mixture consisting of 156 g. β-(p-α,α,γ,γ-tetramethylbutylphenoxy)-β'-chlorodiethyl ether, 92 g. p-benzylphenol, 23.4 g. sodium hydroxide, and 400 g. water, was heated 18 hours in a steel autoclave at 180–190° C., with stirring. The product was washed with hot water. On cooling, the oil layer solidified to a waxy crystalline mass. The pure β(p-α,α,γ,γ-tetramethylbutylphenoxy-β'-(p-benzylphenoxy)-diethyl ether crystallizes from methanol in colorless crystals, M. P. 64° C. Yield 230 g.

A solution of 46 g. of the above product in 100 g. ethylene dichloride was sulphonated at 20° C. with 36.5 g. chlorsulphonic acid for 6 hours. The solution was then neutralized with 10% sodium hydroxide solution and evaporated to dryness in vacuo. The product was a white water-soluble powder useful as a penetrant.

*Example 15.*—A mixture consisting of 156 g. β-p-α, α, γ, γ-tetramethylbutylphenoxy-β'-chlorodiethyl ether, 65 g. sodium sulphide (Na₂S— 60% purity) and 200 g. alcohol was boiled under reflux, with stirring, for 12 hours. The solution was filtered, the alcohol evaporated off, the residual oil taken up in benzene, filtered free from inorganic salts, washed with water, dried, and the benzene removed by evaporation. The product was a pale yellow, viscous oil, having the formula

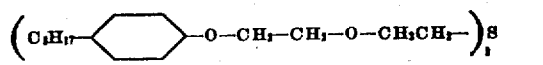

A solution of 29 g. of the above thioether in 50 g. ethylene dichloride was sulphonated at 10–15° C. with 12.2 g. chlorsulphonic acid for 6 hours. The product was then neutralized with 10% sodium hydroxide solution and evaporated to dryness. The product obtained was a water-soluble, soap-like mass.

*Example 16.*—A mixture consisting of 66.8 g. p-ter-butyl-phenol, 94 g. 1,10-dichlor-decane, 20.8 g. sodium hydroxide, and 400 cc. water, was heated, with stirring, in an autoclave, for 8 hours at 180–190° C. The crystalline product obtained, namely, 1,10-di-p-ter-butylphenoxy-decane, after crystallization from alcohol, formed colorless crystals, M. P. 50° C. Upon sulphonation with 2 mol equivalents of chlorsulphonic acid and neutralization with potassium hydroxide, a disulphonate was obtained which is soluble in hot water to give a foamy solution.

In the above examples the alkyl phenols used may be replaced mol for mol by any other alkyl or acylphenol or naphthol having at least 4 carbon atoms in the alkyl or acyl group to yield similar products.

I claim:

1. A sulphonate of an aromatic polyether having the general formula R—O—A—O—R' in which R and R' are each aromatic groups at least one of which contains a nuclear substituent of the group consisting of hydrocarbon and acyl groups of more than three carbon atoms and A is a member of the group consisting of alkylene groups and polyalkylene ether groups in which at least two carbon atoms separate successive ether atoms.

2. A sulphonate of an aromatic polyether having the general formula R—O—A—O—R' in which R and R' are aromatic groups at least one of which contains an alkyl substituent of more than three carbon atoms and A is a member of the group consisting of alkylene groups and polyalkylene ether groups in which at least two carbon atoms separate successive ether atoms.

3. A sulphonate of an aromatic polyether having the general formula R—O—A—O—R' in which R and R' are aromatic groups of the benzene series at least one of which contains an alkyl substituent of more than three carbon atoms and A is a polyalkylene ether group in which at least two carbon atoms separate successive ether atoms.

4. A sulphonate of an aromatic polyether having the general formula R—O—A—O—R' in which R and R' are aromatic groups of the benzene series at least one of which contains an acyl substituent of more than three carbon atoms and A is a polyalkylene ether group in which at least two carbon atoms separate successive ether atoms.

5. A sulphonate of an aromatic polyether having the general formula

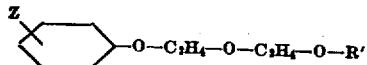

in which Z is an alkyl group having from 4 through 18 carbon atoms and R' is an aromatic nucleus.

6. A sulphonate of an aromatic polyether having the general formula

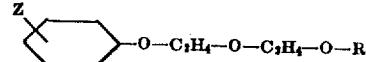

in which Z is an alkyl group having from 4 through 18 carbon atoms and R' is an aromatic nucleus of the benzene series.

7. A disulphonate of bis-$\beta,\beta'$(p-$\alpha,\alpha,\gamma,\gamma$-tetramethylbutyl phenoxy) diethyl ether.

8. A process which comprises reacting in a plurality of stages two molecular equivalents of a phenol containing a nuclear substituent of the group consisting of hydrocarbon and acyl groups of more than three carbon atoms with one molecular equivalent of an aliphatic dihalide in which the halogen atoms are on two terminal carbon atoms, and a sulphonating agent.

9. A process which comprises reacting in a plurality of stages two molecular equivalents of a phenol containing an alkyl substituent of more than three carbon atoms with one molecular equivalent of a member of the group consisting of alkylene dihalides and polyalkylene ether dihalides in which the alkylene groups contain at least two carbon atoms, and a sulphonating agent.

10. A process which comprises reacting in a plurality of stages two molecular equivalents of a phenol containing an alkyl substituent of at least three carbon atoms with one molecular equivalent of a polyethylene dihalide and a sulphonating agent.

11. A process which comprises reacting in a plurality of stages $\alpha,\alpha,\gamma,\gamma$-tetramethylbutyl phenol with one molecular equivalent of $\beta, \beta'$ dichlor diethyl ether, and a sulphonating agent.

12. A process of producing the compounds claimed in claim 1 which comprises reacting in a plurality of stages a sulfonating agent, one molecular equivalent each of phenols having the formula ROH and R'OH and one molecular equivalent of an aliphatic dihalide of the formula X—A—X, wherein R, R', and A have the values specified in claim 1 and X represents halogen atoms attached to terminal carbon atoms of A.

13. A water-soluble sulphonate of $\beta$-laurylphenoxy-$\beta'$-phenoxyethoxydiethyl ether.

14. A water-soluble sulphonate of $\beta$-p-ter-butylphenoxy-ethoxy-$\beta'$-p-ter-butylphenoxy diethyl ether.

HERMAN A. BRUSON.

CERTIFICATE OF CORRECTION.

Patent No. 2,171,498.   August 29, 1939.

HERMAN A. BRUSON.

It is hereby certified that error appears in the printed specification of the above numbered patent requiring correction as follows: Page 1, second column, line 1, for "and" read acid; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.

phonate was obtained which is soluble in hot water to give a foamy solution.

In the above examples the alkyl phenols used may be replaced mol for mol by any other alkyl or acylphenol or naphthol having at least 4 carbon atoms in the alkyl or acyl group to yield similar products.

I claim:

1. A sulphonate of an aromatic polyether having the general formula R—O—A—O—R' in which R and R' are each aromatic groups at least one of which contains a nuclear substituent of the group consisting of hydrocarbon and acyl groups of more than three carbon atoms and A is a member of the group consisting of alkylene groups and polyalkylene ether groups in which at least two carbon atoms separate successive ether atoms.

2. A sulphonate of an aromatic polyether having the general formula R—O—A—O—R' in which R and R' are aromatic groups at least one of which contains an alkyl substituent of more than three carbon atoms and A is a member of the group consisting of alkylene groups and polyalkylene ether groups in which at least two carbon atoms separate successive ether atoms.

3. A sulphonate of an aromatic polyether having the general formula R—O—A—O—R' in which R and R' are aromatic groups of the benzene series at least one of which contains an alkyl substituent of more than three carbon atoms and A is a polyalkylene ether group in which at least two carbon atoms separate successive ether atoms.

4. A sulphonate of an aromatic polyether having the general formula R—O—A—O—R' in which R and R' are aromatic groups of the benzene series at least one of which contains an acyl substituent of more than three carbon atoms and A is a polyalkylene ether group in which at least two carbon atoms separate successive ether atoms.

5. A sulphonate of an aromatic polyether having the general formula

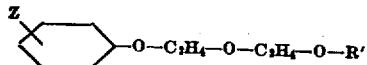

in which Z is an alkyl group having from 4 through 18 carbon atoms and R' is an aromatic nucleus.

6. A sulphonate of an aromatic polyether having the general formula

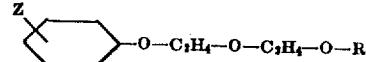

in which Z is an alkyl group having from 4 through 18 carbon atoms and R' is an aromatic nucleus of the benzene series.

7. A disulphonate of bis-$\beta,\beta'$(p-$\alpha,\alpha,\gamma,\gamma$-tetramethylbutyl phenoxy) diethyl ether.

8. A process which comprises reacting in a plurality of stages two molecular equivalents of a phenol containing a nuclear substituent of the group consisting of hydrocarbon and acyl groups of more than three carbon atoms with one molecular equivalent of an aliphatic dihalide in which the halogen atoms are on two terminal carbon atoms, and a sulphonating agent.

9. A process which comprises reacting in a plurality of stages two molecular equivalents of a phenol containing an alkyl substituent of more than three carbon atoms with one molecular equivalent of a member of the group consisting of alkylene dihalides and polyalkylene ether dihalides in which the alkylene groups contain at least two carbon atoms, and a sulphonating agent.

10. A process which comprises reacting in a plurality of stages two molecular equivalents of a phenol containing an alkyl substituent of at least three carbon atoms with one molecular equivalent of a polyethylene dihalide and a sulphonating agent.

11. A process which comprises reacting in a plurality of stages $\alpha,\alpha,\gamma,\gamma$-tetramethylbutyl phenol with one molecular equivalent of $\beta, \beta'$ dichlor diethyl ether, and a sulphonating agent.

12. A process of producing the compounds claimed in claim 1 which comprises reacting in a plurality of stages a sulfonating agent, one molecular equivalent each of phenols having the formula ROH and R'OH and one molecular equivalent of an aliphatic dihalide of the formula X—A—X, wherein R, R', and A have the values specified in claim 1 and X represents halogen atoms attached to terminal carbon atoms of A.

13. A water-soluble sulphonate of $\beta$-laurylphenoxy-$\beta'$-phenoxyethoxydiethyl ether.

14. A water-soluble sulphonate of $\beta$-p-ter-butylphenoxy-ethoxy-$\beta'$-p-ter-butylphenoxy diethyl ether.

HERMAN A. BRUSON.

CERTIFICATE OF CORRECTION.

Patent No. 2,171,498.            August 29, 1939.

HERMAN A. BRUSON.

It is hereby certified that error appears in the printed specification of the above numbered patent requiring correction as follows: Page 1, second column, line 1, for "and" read acid; and that the said Letters Patent should be read with this correction therein that the same may conform to the record of the case in the Patent Office.

Signed and sealed this 10th day of October, A. D. 1939.

(Seal)                                    Henry Van Arsdale,
                                        Acting Commissioner of Patents.